US008952933B2

(12) United States Patent
Chen

(10) Patent No.: US 8,952,933 B2
(45) Date of Patent: Feb. 10, 2015

(54) OPTICAL TOUCH MODULE

(75) Inventor: Hui-Hsuan Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 135 days.

(21) Appl. No.: 13/550,505

(22) Filed: Jul. 16, 2012

(65) Prior Publication Data
US 2013/0021301 A1 Jan. 24, 2013

(30) Foreign Application Priority Data

Jul. 18, 2011 (TW) .............................. 100125330 A

(51) Int. Cl.
G06F 3/042 (2006.01)
(52) U.S. Cl.
CPC .................... *G06F 3/0428* (2013.01)
USPC ......................................... 345/175
(58) Field of Classification Search
CPC ..... G06F 3/042; G06F 3/0421; G06F 3/0425; G06F 3/0428; G06F 2203/04109
USPC ......................... 345/156, 173–178
See application file for complete search history.

(56) References Cited

U.S. PATENT DOCUMENTS

2010/0214268 A1* 8/2010 Huang et al. .................. 345/175
2010/0214270 A1* 8/2010 Lai et al. ....................... 345/175
2011/0061950 A1 3/2011 Cheng et al.
2011/0122075 A1* 5/2011 Seo et al. ...................... 345/173
2012/0056807 A1* 3/2012 Chapman et al. ............. 345/158
2013/0141942 A1 6/2013 Cheng et al.

FOREIGN PATENT DOCUMENTS

TW 200639487 A 11/2006
TW 200717294 A 5/2007
TW 201112091 A1 4/2011

* cited by examiner

Primary Examiner — Ram Mistry
(74) Attorney, Agent, or Firm — Cheng-Ju Chiang

(57) ABSTRACT

An optical touch module disposed on a reference plane and having a sensing area is provided. The optical touch module includes a first light sensing device and a light source module. The first light sensing device is disposed on a first side of the sensing area. The light source module includes a linear light source, a transparent plate and a reflecting device. The linear light source is disposed beside a second side of the sensing area to emit light to the sensing area. The transparent plate is disposed between the linear light source and the second side opposite to the first side. A part of the light is reflected by the transparent plate. Another part of the light passes through the transparent plate. The reflecting device is disposed beside a second surface of the transparent plate to reflect the light reflected from the transparent plate back to the transparent plate.

12 Claims, 4 Drawing Sheets

OPTICAL TOUCH MODULE

TECHNICAL FIELD

The present invention relates to a touch module, and more particularly to an optical touch module and a light source module thereof.

BACKGROUND

Recently, man-machine interfaces in usage of touch modules are more user-friendly and become more and more popular. Therefore, the man-machine interfaces in usage of the touch modules are widely applied to electronic products. Generally, the touch modules include resistance touch modules, capacitive touch modules and optical touch modules, wherein the optical touch modules have an advantage of lower cost.

FIG. 1 is a schematic view of a conventional optical touch module. Referring to FIG. 1, the optical touch module 100 includes a light guide assembly 110, a light emitting device 120 and a light sensing device 130. The light guide assembly 110 includes a pair of light guide bars 112a, 112b, and a strip mirror 114. The pair of light guide bars 112a, 112b and the strip mirror 114 are arranged on three side of a rectangular track, wherein the light guide bar 112a is opposite to the strip mirror 114, and the light guide bar 112b is connected between the light guide bar 112a and the strip mirror 114. The area surrounded by the rectangular track is a sensing area 116. Furthermore, the light emitting device 120 is disposed at the joint of the pair of light guide bars 112a, 112b and configured for emitting light to the light guide bars 112a, 112b. The light guide bars 112a, 112b are configured for converting the light from the light emitting device 120 into linear light, and the liner light illuminates the overall sensing area 116. Moreover, the light sensing device 130 is arranged beside the light guide bar 112a, and a Field of View (FOV) of the light sensing device 130 covers the entire sensing area 116.

The light sensing device 130 is configured for detecting whether there is any light shielding object in the sensing area 116 or not, and calculating the position of the light shielding object in the sensing area 116. In detail, the light sensing device 130 detects the dark points A2, A3 when a mirror point A1 of the touch point (e.g. light shielding object) A in the sensing area 116 is produced through the strip mirror 114. Therefore, the distances d1, d2 can be calculated, and thus the position (coordinates) of the touch point A1 can be calculated by using the distances d1, d2 and other known parameters. The other known parameters include the length of the sensing area 116 along the axis X, the width of the sensing area 116 along the axis Y, the shortest distance between the touch point A and the strip mirror 114 that is equal to the shortest distance between the mirror point A1 and the strip mirror 114, and so on. A detailed method of calculating coordinates is obvious to one of ordinary skill in the art, and thereby the detail description is omitted.

However, the conventional optical touch module 100 has a blind zone 150 formed in an area between the broken line 151 and the strip mirror 114. That is to say, the blind zone 150 is an area which is unable to accurately calculate the position of the touch point. For example, when the touch point B in the sensing area 116 is located in the blind zone 150, the dark point B2 caused by the touch point B and the dark point B3 caused by the corresponding mirror point B1 are partially overlapped, and thereby the position (coordinates) of the touch point B cannot be accurately calculated.

SUMMARY

The present invention provides an optical touch module which can eliminate a blind zone.

The present invention further provides a light source module used in an optical touch module and suitable to eliminate a blind zone thereof.

The present invention provides an optical touch module disposed on a reference plane and defining a sensing area. The optical touch module includes a first light sensing device and a light source module. The first light sensing device is disposed at a first end of a first side of the sensing area, and a first sensing surface of the first light sensing device faces the sensing area. The light source module includes a linear light source, a transparent plate and a reflecting device. The linear light source is disposed beside a second side of the sensing area, and the second side is opposite to the first side. The linear light source is configured to emit light to the sensing area. The transparent plate is disposed between the linear light source and the second side, and an acute angle is formed between the transparent plate and the reference plane. The transparent plate has a first surface and a second surface opposite to the first surface. The linear light source is disposed beside the first surface, while the reflecting device is disposed beside the second surface. A part of the light is reflected by the transparent plate, and another part of the light passes through the transparent plate. The reflecting device is configured to reflect the light reflected from the transparent plate back to the transparent plate.

In an embodiment of the present invention, both the first surface of the transparent plate and the linear light source are opposite to the overall second side of the sensing area, and the reflecting device is opposite to the second surface of the transparent plate.

In an embodiment of the present invention, the optical touch module further includes a second light sensing device disposed at a second end of the first side, and the second light sensing device has a second sensing surface facing the sensing area.

In an embodiment of the present invention, the second side includes a first section and a second section, the first section is formed adjacent to the first light sensing device, both the linear light source and the transparent plate are opposite to the overall first section, and the reflecting device is opposite to the overall second surface of the transparent plate.

In an embodiment of the present invention, the optical touch module further includes a plane mirror disposed beside the linear light source and opposite to the second section of the second side, wherein a mirroring surface of the plane mirror is perpendicular to the reference plane.

In an embodiment of the present invention, the transparent plate is selected from one of a plastic plate and a glass plate.

In an embodiment of the present invention, the acute angle formed between the transparent plate and the reference plane is 45 degrees, an included angle formed between the first surface of the transparent plate and an emitting surface of the linear light source is 45 degrees, and an included angle between the reflecting device and the second surface is also 45 degrees.

In an embodiment of the present invention, the reflecting device is a plane mirror.

In an embodiment of the present invention, the reflecting device includes a transparent substrate and a plurality of reflecting prisms, the transparent substrate has a third surface and a fourth surface, the third surface faces the transparent plate, and the reflecting prisms are disposed on the fourth surface.

In an embodiment of the present invention, the prisms are a plurality of triangular pillars arranged parallel to each other or a plurality of pyramids arranged in an array.

In an embodiment of the present invention, the linear light source includes a point light source and a light guide bar, the point light source is disposed beside an incident surface of the light guide bar, and an emitting surface of the linear light source is one surface of the light guide bar.

In an embodiment of the present invention, the optical touch module further includes at least one reflecting bar disposed on a periphery of the sensing area.

In an embodiment of the present invention, the optical touch module further includes at least one light source disposed on a periphery of the sensing area.

The present invention further provides a light source module disposed on a reference plane. The light source module includes a linear light source, a transparent plate and a reflecting device. The transparent plate has a first surface and a second surface opposite to the first surface. An acute angle is formed between the transparent plate and the reference plane. The linear light source is arranged beside the first surface, while the reflecting device is disposed beside the second surface. When light transmits to the transparent, a part of the light is reflected by the transparent plate and another part of the light passes through the transparent plate. The reflecting device is configured to reflect the light reflected from the transparent plate back to the transparent plate.

In the optical touch module and the light source module of the present invention, the light sensing device detects the optical information caused by a light shielding object and a mirror image of the light shielding object by controlling the linear light source of the light source module to emit the light or not to emit the light, thereby eliminating the blind zone.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
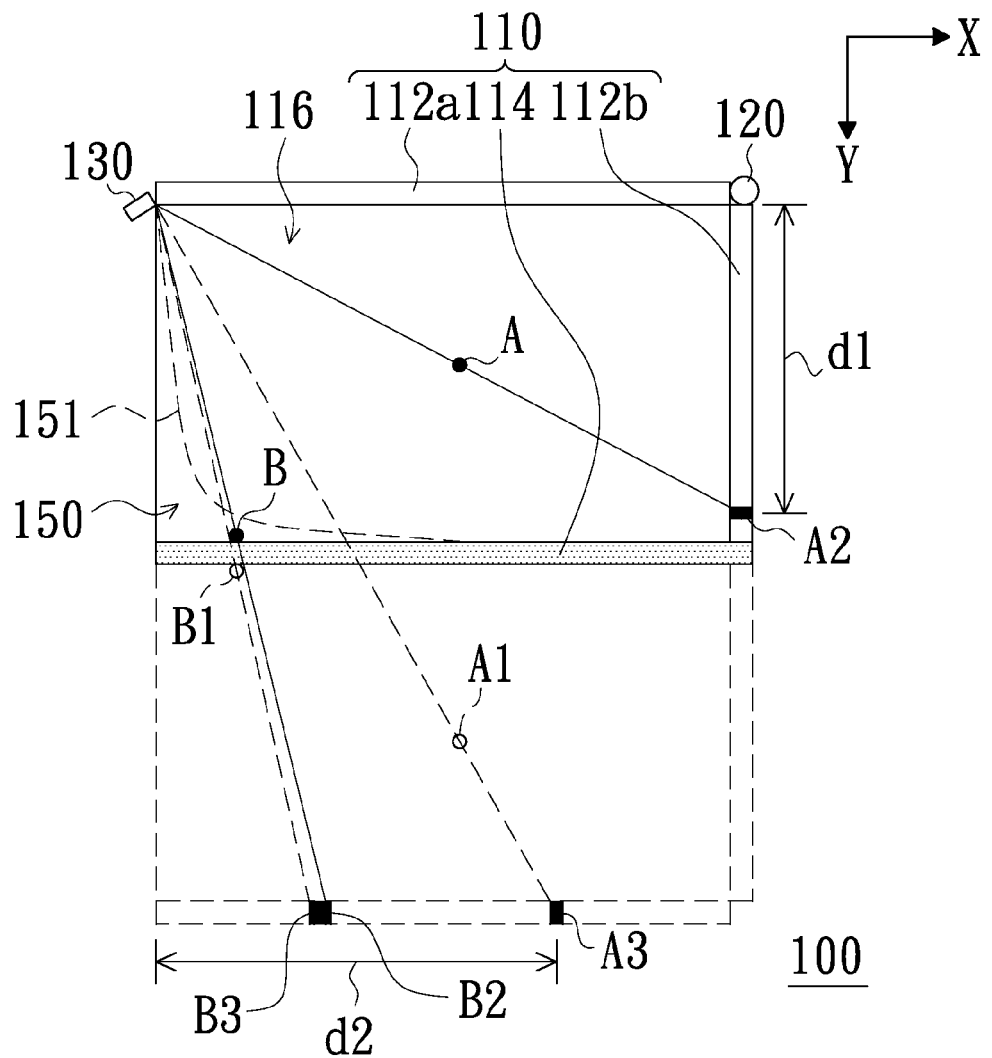
FIG. 1 is a schematic view of a conventional optical touch module.
Figure 2:
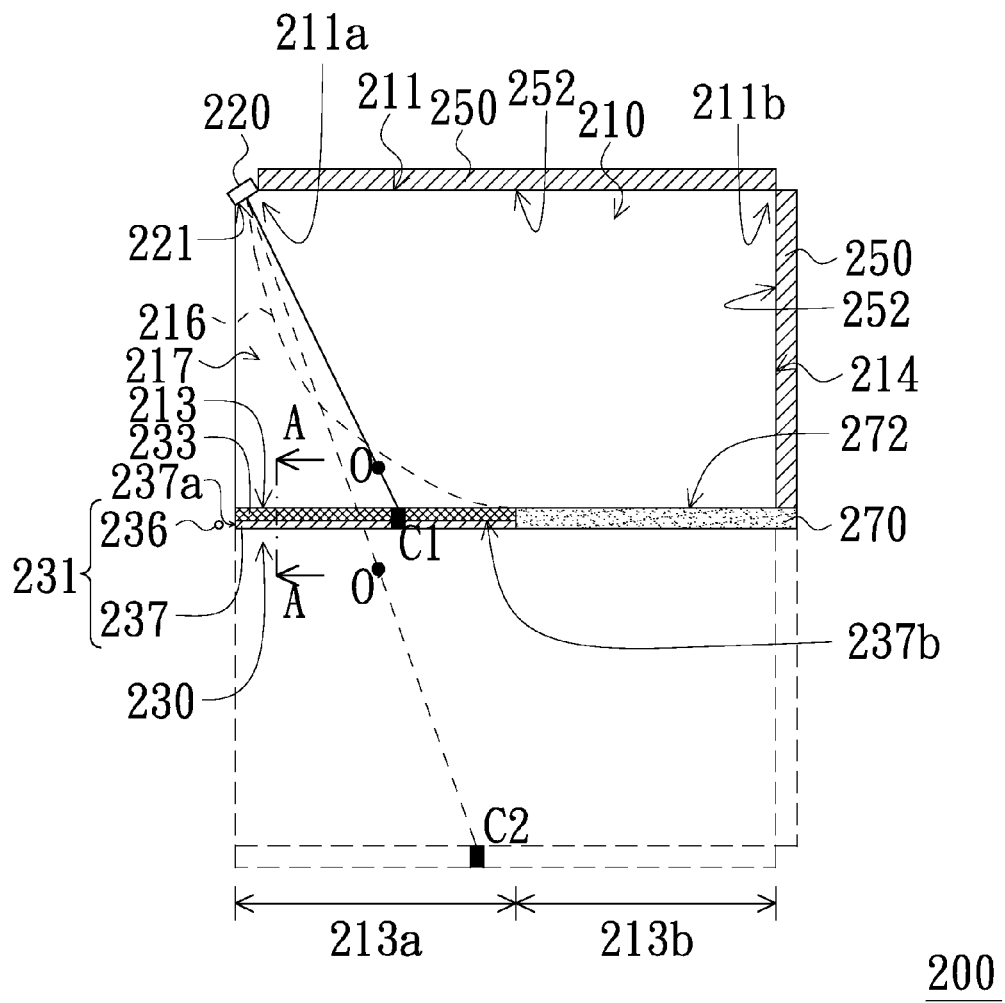
FIG. 2 is a schematic view of an optical touch module according to an exemplary embodiment of the present invention.
Figure 3:
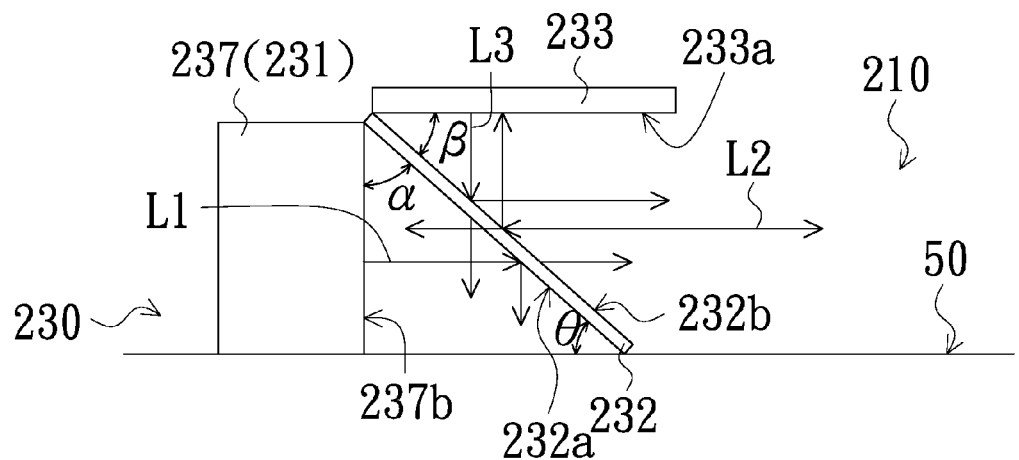
FIG. 3 is a schematic cross-sectional view of a light source module, taken along line A-A of FIG. 2.

FIG. 2 is a schematic view of an optical touch module according to an exemplary embodiment of the present invention, and FIG. 3 is a schematic cross-sectional view of a light source module, taken along line A-A of FIG. 2. Referring to FIGS. 2 and 3, an optical touch module 200 is disposed on a reference plane 50 and has a sensing area 210. A shape of the sensing area 210 may be, but not limited to, rectangular. The optical touch module 200 includes a first light sensing device 220 and a light source module 230. The first light sensing device 220 is disposed at a first end 211a of a first side 211 of the sensing area 210. A first sensing surface 221 of the first light sensing device 220 faces the sensing area 210. The light source module 230 is disposed beside a second side 213 of the sensing area 210, and the first side 211 is opposite to the second side 213.

The optical touch module 200 may further include at least one light source 250 disposed on a periphery of the sensing area 210. In the present embodiment, the optical touch module 200 includes two light sources 250, and each light source 250 is a linear light source. The number and the type of the light source 250 are not limited to this embodiment. In other embodiments, more than two (e.g. three or four) and other types may be employed according to need. In detail, a third side 214 of the sensing area 210 is connected between the first side 211 and the second side 213, and the third side 214 is adjacent to a second end 211b of the first side 211. One light source 250 is disposed on the third side 214, and the other light source 250 is disposed on the first side 211. The light source 250 is configured to provide light emitting from an emitting surface 252 to illuminate the entire sensing area 210. Each light source 250 can include a light guide bar and a point light source (e.g. LED). In another embodiment, two adjacent light sources 250 can share one point light source.

In the present embodiment, the light source module 230 includes a linear light source 231, a transparent plate 232 and a reflecting device 233. The linear light source 231 is disposed beside the second side 213 of the sensing area 210 and configured for providing light to the sensing area 210. The transparent plate 232 is disposed between the linear light source 231 and the second side 213, and an acute angle is formed between the transparent plate 232 and the reference plane 50. The transparent plate 232 has a first surface 232a and a second surface 232b opposite to the first surface 232a, and the linear light source 231 is disposed beside the first surface 232a. A part of the light is reflected by the transparent plate 232, and another part of the light passes through the transparent plate 232. The reflecting device 233 is disposed beside the second surface 232b and configured for reflecting the light reflected from the transparent plate 232 back to the transparent plate 232.

The transparent plate 232 is a plastic plate, a glass plate or other transparent material plate. The transparent plate 232 is not coated with transflective material capable of reflecting a portion of light and passing through a portion of light. The reflecting device 233 can be, but not limited to, a plane mirror. The linear light source 231, for example, includes a point light source 236 and a light guide bar 237. The point light source 236 is disposed beside an incident surface 237a of the light guide bar 237, and an emitting surface 237b of the linear light source 231 is one surface of the light guide bar 237. In detail, the emitting surface 237b of the linear light source 231 faces the sensing area 210, and the point light source 236 is disposed at an end of the second side 213. The light from the point light source 236 is transmitted into the light guide bar 237, and then emitted from the emitting surface 237b. When the point light source 236 is turned on, a part of the light L1 emitted from the emitting surface 237b passes through the transparent plate 232, and then projects on the sensing area 210. When the point light source 236 is turned off, a part of the light L2 from the light source 250 is firstly reflected from the transparent plate 232 to the reflecting device 233, and then the reflecting device 233 reflects the light reflected from the transparent plate 232 back to the transparent plate 232. A part of the light L3 reflected back to the transparent plate 232 is again reflected back to the sensing area 210 by the transparent plate 232. That is to say, when the linear light source 236 is turned off, the reflecting device 233 can be served as a mirror.

In order to eliminate the blind zone of the conventional optical touch module, the second side 213 includes a first section 213a and a second section 213b, wherein the first section 213a is beside the first light sensing device 220. An area 217 formed between the first section 213a and the broken line 216 is a conventional blind zone. That is to say, the first section 213a is corresponded to the area which may produce the blind zone. Furthermore, the light source module 230 is disposed beside the first section 213a, both the first surface 232a of the transparent plate 232 and the linear light source 231 are opposite to the entire first section 213a, and the reflecting device 233 is opposite to the second surface 232b of the transparent plate 232. Thereby, the reflecting device 233 faces the entire first section 213a. Moreover, the acute angle θ between the transparent plate 232 and the reference plane 50 is, for example, 45 degrees, an included angle α between the first surface 232a and the emitting surface 237b is, for example, 45 degrees, and an included angle β between the reflecting device 233 and the second surface 232b is, for example, 45 degrees. Therefore, a reflecting surface 233a of the reflecting device 233 is perpendicular to the emitting surface 237b. In addition, the optical touch module 200 further includes a plane mirror 270 arranged beside the linear light source 231 and opposite to the second section 213b. That is to say, the plane mirror 270 is arranged beside the second section 213b, and a mirror surface 272 of the plane mirror 270 is, for example, perpendicular to the reference plane 50.

In the present embodiment, adequate optical information can be obtained by controlling the linear light source 231 to emit the light or not to emit the light, thereby eliminating the conventional blind zone. Specifically, when a light shielding object O (e.g. finger) operates in the area 217, a mirror image O' of the light shielding object O may be produced by the reflecting device 233. The first light sensing device 220 respectively detects the optical information of the light shielding object O in the sensing area 210 and the optical information of the mirror image O' of the light shielding object O. That is to say, when the point light source 236 is turned on, the light is emitted from the linear light source 231, and then the first light sensing device 220 detects the optical information (the position of the dark point C1) of the light shielding object O. On the other hand, when the point light source 236 is turned off, no light is emitted from the linear light source 231, the first light sensing device 220 detects the optical information (the position of the dark point C2) of the mirror image O' produced by the reflecting device 233. Consequently, by turning on or turning off the point light source 236, the first light sensing device 220 can detect the position of the dark point C1 caused by the light shielding object O and the position of the dark point C2 caused by the mirror image O' in sequence, and thereby the adequate optical information is obtained. Thus, the correct coordinates of the light shielding object O is accurately calculated by the positions of the dark points C1, C2, so as to eliminate the blind zone of the prior art, and improve the sensing precision of the optical touch module 200.

Figure 4:
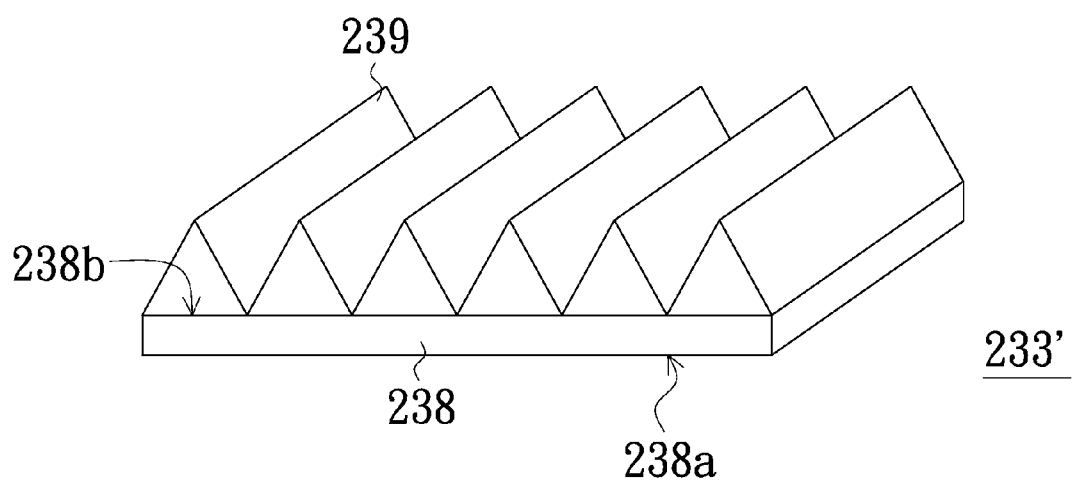
FIG. 4 is a schematic view of a reflecting device according to another exemplary embodiment of the present invention.

In addition, although the reflecting device 233 of the present embodiment is the plane mirror, but the reflecting device of the present invention is not limited to this. Referring to FIG. 4, a reflecting device 233', according to another embodiment, is shown. The reflecting device 233' can include a transparent substrate 238 and a plurality of reflecting prisms 239. The transparent substrate 238 includes a third surface 238a facing the transparent plate, and a fourth surface 238b opposite to the third surface 238a. The reflecting prisms 239 are disposed on the fourth surface 238b. In the present embodiment, the reflecting prisms 239 are triangular pillars arranged parallel to each other. In another embodiment, the reflecting prisms can be pyramids arranged in an array.

It should be noted, when the optical touch module 200 includes only one first light sensing device 220, the light source module 230 is disposed along the entire second side 213. That is to say, the plane mirror 270 can be omitted and be replaced by the light source module 230. In another embodiment, the optical touch module includes two light sensing devices, and the light source module is disposed along the entire second side 213. The detailed description is given below.

Figure 5:
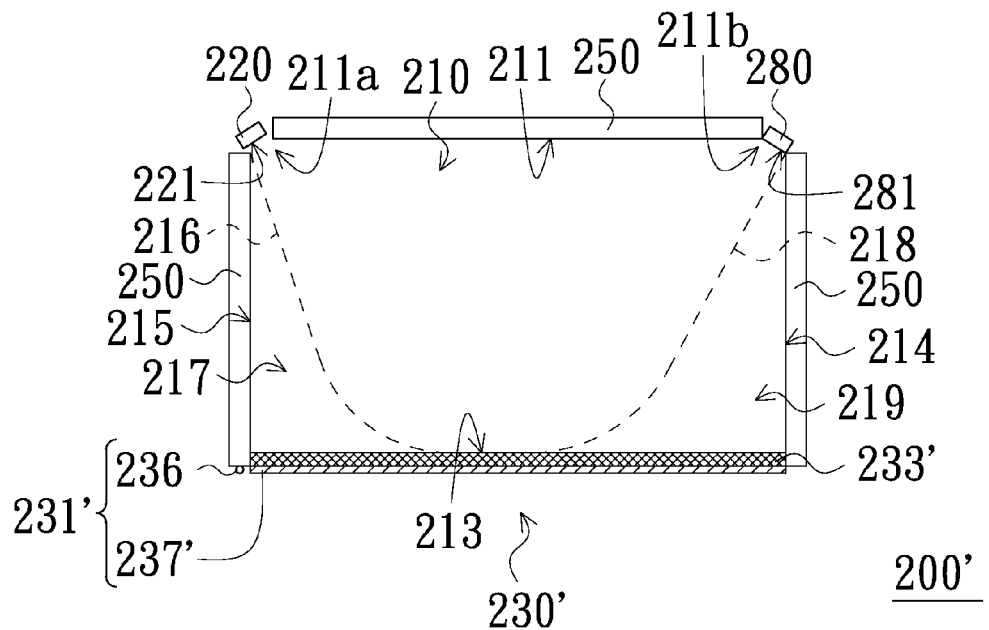
FIG. 5 is a schematic view of an optical touch module according to another exemplary embodiment of the present invention.

Referring to FIG. 5, a schematic view of an optical touch module 200', according to another embodiment, is shown. Comparing to the optical touch module 200, the optical touch module 200' further includes a second light sensing device 280, the light source module 230' is arranged on the entire second side 213, and the plane mirror 270 is omitted. Furthermore, A light source 250 (e.g. linear light source) is disposed on a fourth side 215 of the sensing area 210 to emit light toward the sensing area 210, wherein the fourth side 215 is opposite to the third side 214 and connected between the first side 211 and the second side 213. The second light sensing device 280 is disposed at the second end 211b of the first side 211, and a second sensing surface 281 of the second light sensing device 280 faces the sensing area 210. The transparent plate (not shown) and the linear light source 231' are opposite to the entire second side 213, and the reflecting device 233' is opposite to the entire second surface of the transparent plate, so the reflecting device 233' is also opposite to the entire second side 213. The relative position between the transparent plate, the reflecting device 233' and linear light source 231' is same as that shown in FIG. 3, so not described in detail herein.

In the present embodiment, an area 219 formed between the broken line 218 and the second side 213 may also produce a blind zone apart from the area 217, and thereby the light source module 230' is arranged on the entire second side 213 to avoid the blind zone. The manner to prevent the area 219 from becoming the blind zone is same as the manner to prevent the area 217 from becoming the blind zone, and detailed description is omitted.

Figure 6:
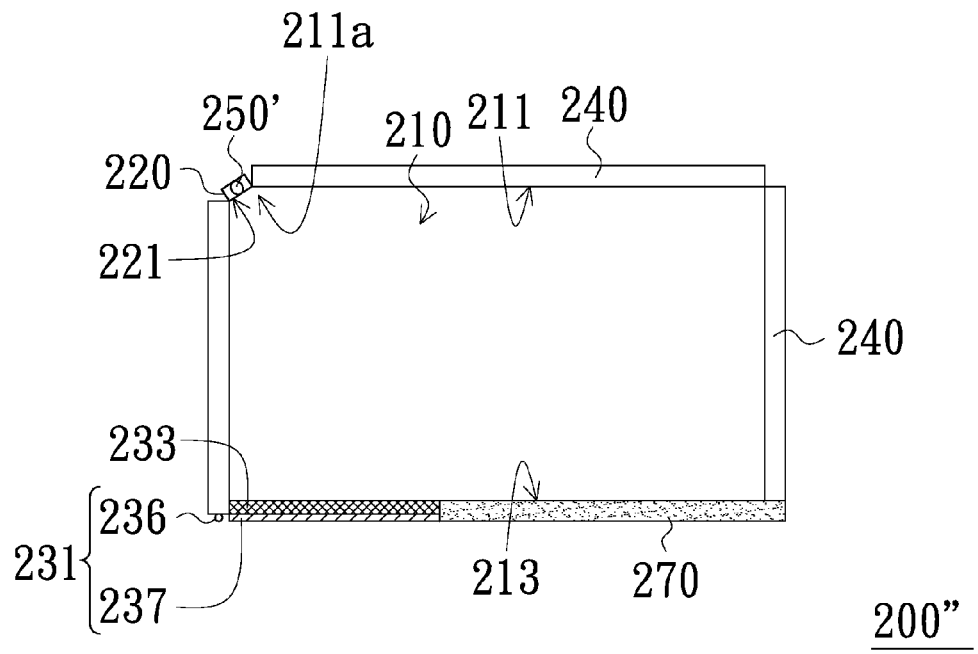
FIG. 6 is a schematic view of an optical touch module according to another exemplary embodiment of the present invention.

Referring to FIG. 6, a schematic view of an optical touch module 200", according to another embodiment, is shown. The difference between the optical touch module 200 and the optical touch module 200" is that the types of the light sources are different. In the present embodiment, the light source 250' is a point light source, and disposed above the first light sensing device 220 to directly emit light toward the sensing area 210. Moreover, the optical touch module 200" may further include at least one reflecting bar 240 disposed on a periphery of the sensing area 210. In the present embodiment, the optical touch module 200" includes two reflecting bars 240 respectively disposed on the first side 211 and the third side 214. That is to say, the two linear light sources 250 shown in FIG. 2 are replaced by the two reflecting bars 240. The advantages of the optical touch module 200″ are similar to that of the optical touch module 200 disclosed above, and are not described here. Furthermore, the linear light source 250 shown in FIG. 5 can be replaced by the reflecting bar 240, and two light sources 250′ are respectively disposed on the first light sensing devices 220 and the second light sensing devices 280.

In summary, in the optical touch module of the present invention, the light sensing device can detect the optical information caused by the light shielding object and the mirror image by controlling the linear light source of the light source module to emit the light or not to emit the light, thereby eliminating the blind zone to obtain the optical touch module with reliable sensing accuracy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch module disposed on a reference plane and defining a sensing area, the optical touch module comprising:
   at least one light source disposed on a periphery of the sensing area;
   a first light sensing device disposed at a first end of a first side of the sensing area, and a first sensing surface of the first light sensing device facing the sensing area; and
   a light source module comprising:
   a linear light source disposed beside a second side of the sensing area and configured to emit light to the sensing area, the second side being opposite to the first side;
   a transparent plate disposed between the linear light source and the second side of the sensing area, an acute angle being formed between the transparent plate and the reference plane, the transparent plate having a first surface and a second surface opposite to the first surface, the linear light source being disposed beside the first surface, a part of the light being reflected by the transparent plate, and another part of the light passing through the transparent plate; and
   a reflecting device disposed beside the second surface of the transparent plate and configured to reflect light emitted by the at least one light source from the reflecting device back to the transparent plate whereas the light emitted by the linear light source after passing through the transparent plate and the light reflected from the reflecting device back to the transparent plate after being reflected again by the transparent plate are emitted along a same advancing direction.

2. The optical touch module according to claim 1, wherein both the first surface of the transparent plate and the linear light source are opposite to the second side of the sensing area, and the reflecting device is opposite to the second surface of the transparent plate.

3. The optical touch module according to claim 2, further comprising a second light sensing device disposed at a second end of the first side, and the second light sensing device having a second sensing surface facing the sensing area.

4. The optical touch module according to claim 1, wherein the second side comprises a first section and a second section, the first section is formed adjacent to the first light sensing device, both the linear light source and the transparent plate are opposite to the first section, and the reflecting device is opposite to the second surface of the transparent plate.

5. The optical touch module according to claim 4, further comprising a plane mirror disposed beside the linear light source and opposite to the second section of the second side, wherein a mirroring surface of the plane mirror is perpendicular to the reference plane.

6. The optical touch module according to claim 1, wherein the transparent plate is selected from one of a plastic plate and a glass plate.

7. The optical touch module according to claim 1, wherein the acute angle formed between the transparent plate and the reference plane is 45 degrees, an included angle formed between the first surface of the transparent plate and an emitting surface of the linear light source is 45 degrees, and an included angle between the reflecting device and the second surface is also 45 degrees.

8. The optical touch module according to claim 1, wherein the reflecting device is a plane mirror.

9. The optical touch module according to claim 1, wherein the reflecting device comprises a transparent substrate and a plurality of reflecting prisms, the transparent substrate has a third surface and a fourth surface, the third surface faces the transparent plate, and the reflecting prisms are disposed on the fourth surface.

10. The optical touch module according to claim 9, wherein the reflecting prisms are selected from one of a plurality of triangular pillars arranged parallel with each other and a plurality of pyramids arranged in an array.

11. The optical touch module according to claim 1, wherein the linear light source comprises a point light source and a light guide bar, the point light source is disposed beside an incident surface of the light guide bar, and an emitting surface of the linear light source is one surface of the light guide bar.

12. The optical touch module according to claim 1, further comprising at least one reflecting bar disposed on a periphery of the sensing area.

* * * * *